United States Patent
Oroskar et al.

(10) Patent No.: US 8,670,763 B1
(45) Date of Patent: Mar. 11, 2014

(54) SERVICE DEPENDENT HANDOFF CHANNEL SELECTION

(71) Applicant: Sprint Spectrum L.P., Overland Park, KS (US)

(72) Inventors: Siddharth S. Oroskar, Overland Park, KS (US); John W. Prock, Peculiar, MO (US); Maulik K. Shah, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 13/671,981

(22) Filed: Nov. 8, 2012

(51) Int. Cl.
*H04W 36/00* (2009.01)

(52) U.S. Cl.
USPC ......... 455/437; 455/432.1; 455/438; 370/331

(58) Field of Classification Search
USPC ................ 455/437–444, 466, 432.1; 370/331
See application file for complete search history.

(56) References Cited

U.S. PATENT DOCUMENTS

| | | | |
|---|---|---|---|
| 7,149,524 B2 * | 12/2006 | Reynolds | 455/437 |
| 7,171,206 B2 * | 1/2007 | Wu | 455/438 |
| 7,623,866 B1 * | 11/2009 | Spitzer | 455/442 |
| 7,639,641 B2 * | 12/2009 | Laitinen et al. | 370/328 |
| 8,233,450 B2 * | 7/2012 | Zaki et al. | 370/331 |
| 8,380,200 B1 * | 2/2013 | Spitzer et al. | 455/436 |
| 2004/0252656 A1 * | 12/2004 | Shiu et al. | 370/328 |
| 2005/0020203 A1 * | 1/2005 | Losh et al. | 455/11.1 |
| 2006/0056448 A1 * | 3/2006 | Zaki et al. | 370/466 |
| 2008/0146232 A1 * | 6/2008 | Knisely | 455/437 |
| 2009/0047958 A1 * | 2/2009 | Rimhagen et al. | 455/436 |
| 2009/0247159 A1 * | 10/2009 | Flore et al. | 455/434 |
| 2012/0250548 A1 * | 10/2012 | Swaminathan et al. | 370/252 |

OTHER PUBLICATIONS

Alcatel Lucent, Strategic White Paper, "The LTE Network Architecture: A comprehensive tutorial," 26 pages, dated 2009.

* cited by examiner

*Primary Examiner* — Charles Shedrick

(57) ABSTRACT

A method and corresponding system for management of neighbor scanning in a cellular wireless communication system is disclosed. A radio access network (RAN) sends, and a mobile device receives, a neighbor list update message containing a plurality of different neighbor lists each listing available neighboring coverage areas communicating on respective communication channels. While the mobile device is engaged in a call, the mobile device selects one of the neighbor lists based on a service type of the engaged call. The mobile device scans the neighbors listed in the selected neighbor list for signal strengths sufficient to trigger a handoff. The mobile device sends a report indicating measured signal strengths of signals from the neighbors to the RAN, which then instructs the mobile device to hand off the engaged call.

20 Claims, 6 Drawing Sheets

SERVICE DEPENDENT HANDOFF CHANNEL SELECTION

BACKGROUND

Cellular wireless systems are used to communicate voice and data with cellular telephones, personal digital assistants (PDAs), cellular modems, and other mobile devices. Such cellular wireless systems typically include a radio access network (RAN) that wirelessly communicates with such mobile devices. The wireless network can be connected to the Internet and also to the Public Switched Telephone Network (PSTN), allowing for users located within the coverage area(s) to communicate both with the PSTN and the Internet using such mobile devices. Thus, a user can retrieve information from the Internet (or send information to the Internet) in a data session where the mobile device exchanges packets of data with Internet servers through the wireless network. A user can also receive and/or place calls over the PSTN using such a mobile device.

Cellular wireless systems typically include a number of transceiver stations for wirelessly communicating data and/or voice information with mobile devices over radio channels. The transceiver stations each include a combination of directional and/or non-directional antennas that radiate to define a radiation pattern. The radiation patterns of the transceiver stations thus define geographic coverage areas in which mobile devices are able to send and receive signals with sufficient signal strength to communicate with the RAN. The coverage areas divide the cellular wireless system geographically into a number of cells and mobile devices within each coverage area communicate with the RAN via a respective transceiver station for that coverage area. Accordingly, transceiver stations are situated to provide coverage in geographic regions where coverage is desired.

The transceiver stations for each coverage area emit a pilot signal or reference signal. The pilot signals or reference signals are received by mobile devices to inform the mobile devices of the coverage areas available for communicating with the RAN. The mobile devices use the pilot signals or reference signals to identify coverage areas to join and then seek service on the RAN on one or more coverage areas. Coverage areas of nearby, or neighboring, transceiver stations can overlap geographically such that mobile devices may generally detect signals (e.g., pilot or reference signals) from more than one coverage area while in such overlapping regions. Signals from different coverage areas are distinguishable from one another to allow mobile devices in such overlapping regions to distinguish signals from one coverage area from those of another. For example, signals from different coverage can have different encoding parameters, such as in a code division multiple access (CDMA) architecture, or different frequencies, such as in an orthogonal frequency-division multiplexing (OFDM) architecture used in a long term evolution (LTE) network.

To provide substantially continuous network service to a mobile device passing between coverage areas, the RAN is configured to transfer (hand off) ongoing communications with such a mobile device between the coverage areas. For example, a mobile device can pass from a first coverage area to a second coverage area while remaining connected to the RAN. In such an example, the RAN transfers ongoing communications with the mobile device from a transceiver station for the first coverage area to a transceiver station for the second coverage area. Typically such transfers (or handoffs) occur while the mobile device is in an overlapping region where signals from the first and second coverage areas are both detected. In other words, such an overlapping region is an area where the mobile device is able to send and receive signals with sufficient signal strength to communicate with both the transferred-from transceiver station (for the first coverage area) and the transferred-to transceiver station (for the second coverage area).

Procedures for initiating and managing transceiver station handoff vary depending on the network architecture employed. Generally, each mobile device in the RAN regularly monitors signal strengths from pilot or reference signals emitted from its presently active coverage area as well as from neighboring coverage areas. The mobile device sends a message that includes an indication of the measured signal strengths. The message is received by the transceiver station, and the RAN determines whether to instruct the mobile device and transceiver stations to hand off an ongoing call to one of the neighboring coverage areas. Such hand off determinations can be made by a centralized radio network controller (RNC), such as in a CDMA system, or by distributed network controllers co-located with the transceiver stations, such in an LTE system including evolved Node B (eNB) transceiver stations. In some instances, the mobile device may only send such a signal strength report upon detecting a signal strength from a neighbor that satisfies a trigger, such as a signal strength that exceeds a predetermined threshold level, or a signal strength that exceed those of a currently active coverage area.

Each mobile device can store a list of neighboring coverage areas (a neighbor list) to scan for handoff. The neighbor list can include a listing of coverage areas surrounding the currently active coverage area and an indication of how to identify pilot signals or reference signals from such neighboring coverage areas (such as an encoding parameter or frequency channel). The RAN may provide such a neighbor list to each mobile device upon initial connection with the RAN and establishment of an active coverage area. The RAN may also provide an updated list to each mobile device upon handoff to another coverage area.

Due to variations in development of cellular wireless service amongst different providers and/or different wireless standards, transceiver stations in different regions may operate at different carrier frequencies (different channels). For instance, commonly employed radio frequency communication channels include channels in the 800 megahertz (MHz) band, 850 MHz band, 1800 MHz band, and 1900 MHz frequency band, among others. As a result, some mobile devices include appropriate interfaces to tune to one or more channels. For example, a "quad-band" mobile phone includes a receiver to communicate on channels in four different frequency bands, such as channels in the 800, 850, 1800, and/or 1900 MHz bands. As a multi-band mobile device moves from a coverage area operating in one band to a coverage area operating in another band, the mobile device wireless interface can transition from one channel to the other in order to facilitate handoff.

In operation then, a mobile device can detect a pilot or reference signal to identify a coverage area to join. The mobile device joins a coverage area, which may be referred to herein as an active coverage area. The mobile device is provided with a neighbor list identifying neighboring coverage areas to scan for handoff, and the neighboring coverage areas may operate on more than one carrier frequency. A call such as a voice call or data session can be initiated, and signals for communicating voice or data information are communicated between the mobile device and a transceiver station for the active coverage area. While the call is ongoing, the mobile device scans pilot signals or reference signals from the neighboring coverage areas and measures signals strengths. To initiate handoff, the mobile device sends a message indicating the measured signal strengths. A centralized or distributed controller system for the RAN evaluates the measured signal strengths in view of network loading and determines whether to instruct the wireless system to hand off communication to a neighboring coverage area. The RAN then sends instructions to the mobile device and to any affected transceiver stations to instruct that the communication of the active call be handed off.

OVERVIEW

Some cellular wireless service providers may preferentially transmit calls of different service types over channels with different carrier frequencies. For example, a service provider may preferentially communicate voice calls over a first channel and similarly preferentially communicate data sessions over a second channel. Some networks may therefore be configured to assign new calls to preferred frequency bands based on the service types of the new calls (subject to availability of the preferred frequency bands in particular regions). For example, voice service calls (e.g., circuit-switched network connections for carrying voice data) can be initiated on an 800 MHz band channel, while data service calls (e.g., packet-switched network connections) can be initiated on a 1900 MHz band channel.

However, communication channel availability is geographically limited due to variations in wireless service provider network infrastructure. As a result, some regions may have one channel available for communication, while others may have two or more channels available for communication. Moreover, a moving mobile device engaged in a call may traverse through geographic regions with varying channel availability all while engaged in a single call. Thus, it may be desirable to preferentially assign handed off calls to frequency bands based on the service type of the handed off calls. Preferential frequency band assignment during handoff would allow for calls that are initially in regions that lack the preferred frequency band to be transferred to the preferred frequency band during handoff. Similarly, calls that originate on the preferred frequency band can remain on the preferred frequency band during handoff.

The present disclosure provides a method to preferentially assign handed off calls to frequency bands based on the service type of the handed off calls. The disclosed method preferentially directs network traffic by having the RAN send multiple neighbor lists to a mobile device. Each of the neighbor lists indicates neighboring coverage areas for communicating a respective type of communication (e.g., data session, voice call). Thus, each of the neighbor lists is associated with a respective frequency band and lists neighboring coverage areas operating in the frequency band. The mobile device selects the neighbor list associated with the service type of a call on which the mobile device is currently engaged and scans the neighbors listed on that list to identify coverage areas for handoff.

For example, the RAN can transmit: (i) a first neighbor list including coverage areas operating in a first frequency band that preferentially carries wireless communications of a first service type; and (ii) a second neighbor list including coverage areas operating in a second frequency band that preferentially carries wireless communications of a second service type. A mobile device that is actively engaged in a call selects the neighbor list that corresponds to the service type of the actively engaged call and scans for pilot signals or reference signals from coverage areas included in the selected neighbor list. The mobile device then sends a message to the RAN reporting the measured signal strengths and the RAN determines whether to instruct the mobile device and/or transceiver stations to hand off communication of the active call. Because the mobile device scans the list with coverage areas corresponding to the service type of the active call, the call is handed off to a coverage area operating in a frequency band for the service type of the active call.

The RAN can transmit the multiple neighbor lists in a single neighbor list update message (NLUM) or in separate messages each including one of the multiple neighbor lists. The neighbor lists can also be provided in a single list that includes an indication of service types associated with each coverage area in the list. For example, a neighbor list can identify each coverage area and also specify the service types that are preferentially communicated on the coverage area.

Thus, disclosed herein is a method and corresponding system to assign calls to communication channels during handoff based on a service type of the call. By assigning calls to communication channels based on the service type of the calls, a wireless system is able to distribute network traffic of different types on preferred frequency bands during handoff. In particular, the disclosed method allows a wireless service provider to preferentially assign network traffic to preferred frequency bands to the extent the preferred frequency bands are available regardless of the availability elsewhere in the network.

In some embodiments, the present disclosure provides a method involving wireless receiving, at a mobile device in a base coverage area, a first neighbor list and a second neighbor list. The first neighbor list can include one or more coverage areas neighboring the base coverage area and configured to communicate via a first communication channel. The second neighbor list can include one or more coverage areas neighboring the base coverage area and configured to communicate via a second communication channel. The method can also involve the mobile device selecting one of the first or second neighbor lists while the mobile device is actively engaged in a call based on a service type of the actively engaged call. The method can also involve the mobile device scanning the one or more coverage areas included in the selected neighbor list.

In some embodiments, the present disclosure provides a method involving transmitting, to a base coverage area so as to be received by a mobile device situated therein, a first neighbor list and a second neighbor list. The first neighbor list can include one or more coverage areas neighboring the base coverage area and configured to communicate via a first communication channel. The second neighbor list can include one or more coverage areas neighboring the base coverage area and configured to communicate via a second communication channel. The method can also involve receiving a signal strength report indicating signal strengths measured by the mobile device of detected signals, if any, from the one or more coverage areas included in a selected one of the first or second neighbor lists. The mobile device can be actively engaged in a call and can select the selected neighbor list based on a service type of the actively engaged call. The method can also involve selecting one of the one or more coverage areas included in the selected neighbor list based at least in part on the received signal strength report. The method can also involve directing the mobile device to hand off the actively engaged call to the selected coverage area so as to continue the actively engaged call.

In some embodiments, the present disclosure provides a mobile device including an antenna and a controller. The antenna can be for wirelessly communicating with a radio access network. The antenna can wirelessly receive first and second neighbor lists each including one or more coverage areas associated with a respective communication channel. The controller can be configured to: (i) operate the antenna to send and receive signals to communicate information for an actively engaged call; (ii) select one of the first or second neighbor lists based on a service type of the actively engaged call; and (iii) scan the one or more coverage areas included in the selected neighbor list.

These as well as other aspects and advantages will become apparent to those of ordinary skill in the art by reading the following detailed description, with reference where appropriate to the accompanying drawings.

BRIEF DESCRIPTION OF THE DRAWINGS

Various example embodiments are described herein with reference to the following drawings, wherein like numerals denote like entities.

DETAILED DESCRIPTION

1. Example Architecture

Figure 1:
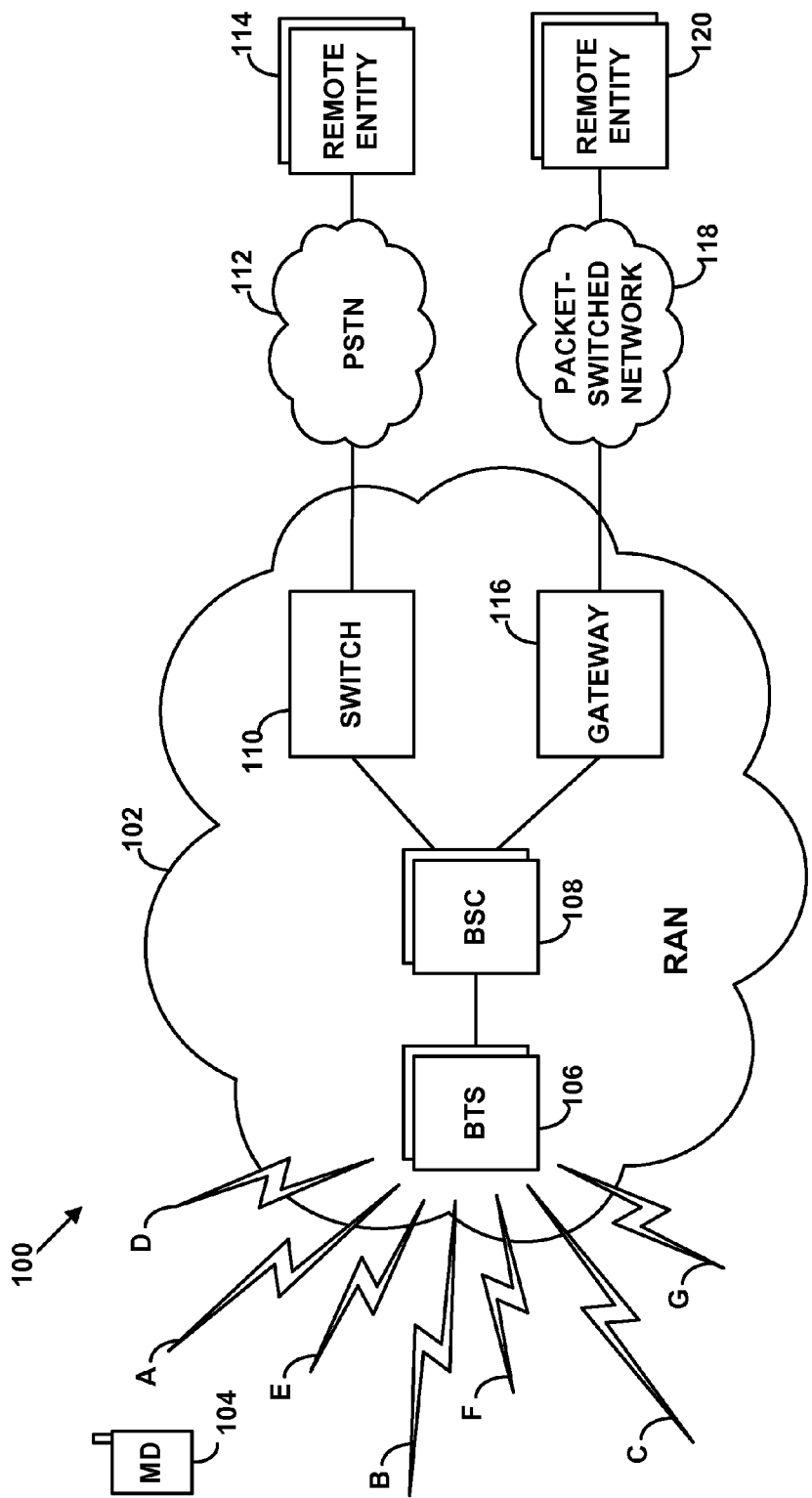
FIG. 1 is a simplified block diagram of an example cellular wireless communication system.

Referring now to the drawings, FIG. 1 is a simplified block diagram of an example cellular wireless communication system 100. For purposes of explanation and example only, the wireless communication system 100 shown in FIG. 1 is generally arranged with the CDMA system architecture. It should be understood, however, that this and other arrangements and functions described herein (including in the above overview section) are set forth for purposes of example only, and other arrangements and functions can be used instead and some may be omitted altogether. For example, the cellular wireless system 100 may be replaced with a long term evolution (LTE) system architecture as will be appreciated.

Further, as in most telecommunications applications, those skilled in the art will appreciate that many of the components described herein are functional entities that may be implemented with hardware, firmware and/or software (e.g., one or more processors executing program instructions), and as discrete components or in conjunction with other components, in any suitable combination and location.

Still further, the names of various components are not intended to indicate association with just one type of system. Various systems may use analogous components under other names. In one non-limiting example of such a substitution of components, it is noted that in an LTE system architecture the base transceiver stations (BTSs) 106 operated by base station controllers (BSCs) 108, may be replaced by evolved Node B (eNB) transceiver stations, which wirelessly transmit and receive information to and from mobile devices and also include many of the network control functions of the BSCs, and which may also be inter-connected to one another.

As shown in FIG. 1, the system 100 includes a radio access network (RAN) 102 that is arranged to provide multiple mobile devices with wireless communication service. FIG. 1 depicts one representative mobile device 104 by way of example, which could be a cell phone, wirelessly equipped PDA, or any other type of wirelessly-equipped device now known or later developed. As will be described further below, mobile device 104 is equipped with hardware, software, and/or other logic to communicate with RAN 102 in accordance with an agreed communication protocol, such as CDMA (e.g., IS-95, IS-1040, 1xRTT, 1xEV-DO, etc.), LTE, WiMAX, iDEN, TDMA, AMPS, GSM, GPRS, UMTS, EDGE, or any other communication protocol now known or later developed.

RAN 102 defines a plurality of sectors (coverage areas) in which mobile devices can communicate with the RAN. For example, the plurality of sectors can be CDMA sectors operating on respective pseudo-random noise offsets (PN offsets) to distinguish signals from different sectors. In particular, FIG. 1 shows RAN 102 radiating to define seven sectors (although the RAN can define any number of sectors), three of which are labeled respectively A, B, and C, and four of which are labeled D, E, F, and G. In one example, sectors A, B, and C are active set members of mobile device 104 and the four sectors labeled D-G are neighbor sectors of active set members A, B, and C. In another example, such as in an LTE system architecture, sectors A-G may be distinguished by carrier frequency (e.g., according to an OFDM arrangement), mobile device 104 is connected to sector A, and sectors B-G are neighbor sectors.

RAN 102 may define the sectors A-G discretely through use of directional antennas as noted above and/or by various modulation parameters, including, without limitation, carrier frequencies and PN offsets or other parameters, depending on the air interface protocol used. In practice, the sectors may overlap to some extent, so that a served mobile device can communicate with multiple sectors when at a particular location. Moreover, each of the sectors A-G can wirelessly communicate via one or more communication channels, such as an 800 megahertz (MHz) band, 850 MHz band, 1800 MHz band, 1900 MHz band, etc. The communication channels described herein may refer to approximate carrier frequencies of frequency bands reserved for cellular wireless communication. In some instances, one group of the neighboring sectors (e.g., sectors D, E) can communicate via one channel (e.g., an 800 MHz band), while another group of the neighboring sectors (e.g., sectors F, G) can communicate via another channel (e.g., a 1900 MHz band).

RAN 102 can take various forms and may include any of a variety and number of components, depending for instance on the air interface protocol employed by the RAN. For example, the RAN may include one or more BTSs 106 and one or more BSCs 108. BTSs 106 may include directional antennas, power amplifiers, and associated transceiver equipment arranged to establish sectors A-G and to communicate with served mobile device 104. Moreover, RAN 102 may additionally or alternatively include one or more eNBs, which may include directional antennas, power amplifiers, associated transceiver equipment, and network controller modules arranged to establish sectors A-G and to communicate with served mobile device 104. As such, some or all of the sectors may emanate from a single BTS or eNB (i.e., a single cell site), or various ones of the sectors may emanate from separate BTSs or eNBs.

Each BSC 108 may control one or more BTSs 106 and may manage aspects of air interface operation. For instance, a BSC may manage assignment of air interface traffic channels to served mobile devices in response to mobile device origination messages. Further, a BSC may manage handoff of served mobile devices between sectors by engaging in control channel signaling with the mobile devices. Such control channel signaling may include, for instance, sending and/or receiving neighbor list messages, signal strength report messages, handoff direction messages, and handoff confirmation messages.

In one example, BSC 108 may transmit to served mobile device 104 (i) a handoff direction message identifying one or more sectors for the mobile device 104 to connect to and handoff parameters, such as signal strength thresholds and (ii) a neighbor list update message that may be included in the handoff direction message or may be its own separate message. The neighbor list update message can contain a plurality of different neighbor lists. At some time after sending the handoff direction message and neighbor list update message, BSC 108 may receive a signal strength report message (i.e., a trigger to prompt BSC 108 to update neighbor list data in mobile device 104 and/or determine whether to hand off communication with mobile device 104 to a new sector) from mobile device 104 that indicates signal strengths detected by the mobile device 104. This may occur, for instance, if mobile device 104 determines that a neighbor sector has a signal strength that exceeds a threshold. In response to receiving the signal strength report message, BSC 108 may send to mobile device 104 (i) another handoff direction message providing a new active set for mobile device 104 and directing the mobile device to hand off to a new active set member and (ii) a neighbor list update message. The new neighbor list update message may contain a plurality of neighbor lists corresponding to the mobile device's revised active set.

To facilitate communication between served mobile devices and remote entities 114 on the PSTN 112, each BSC 108 may be coupled with an MSC or other switch 110 that provides connectivity with the PSTN 112. Each BSC 108 may also be coupled with a PDSN or other gateway 116 that provides connectivity with a packet-switched network 118, so that served mobile devices can communicate with remote entities 120 on the packet-switched network.

In another example of the RAN 102, such as an LTE system architecture, eNBs can be connected to a core network via a packet data network gateway (P-GW), which is used to communicate administrative information such as IP address allocation, and a serving gateway (S-GW), which is used to communicate data payloads. A mobility management entity (MME) processes signals between the mobile device 104 and the core network and serves as a control node in establishing, maintaining, releasing, and reallocating network resources (e.g., channels available for sending and receiving data packets through the S-GW).

Figure 2:
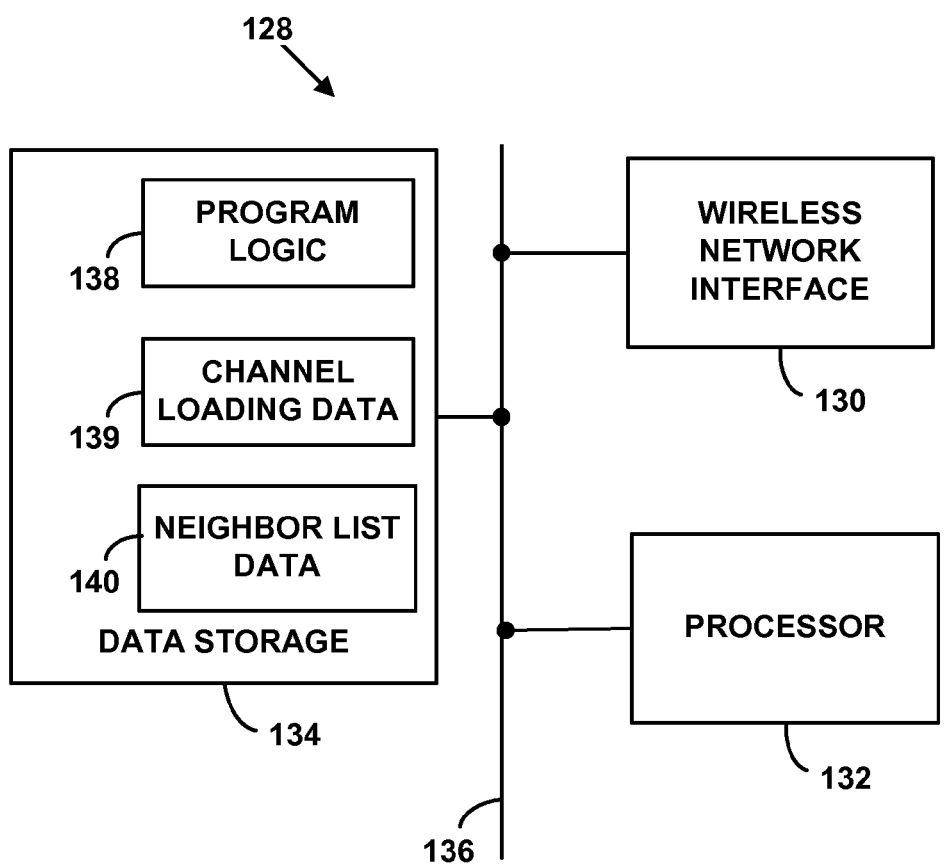
FIG. 2 is a simplified block diagram of some example functional elements of a radio access network.

The various components of RAN 102 (e.g., BTS 106 and BSC 108, eNB) may comprise any number of functional elements. FIG. 2 is a simplified block diagram showing some of the functional elements 128 that can be included in one or more (or a combination) of the components of RAN 102, in accordance with an example embodiment. As shown, the functional elements 128 include a wireless network interface 130, a processor 132, and data storage 134, all of which may be communicatively linked together by a system bus, network, or other connection mechanism 136.

Wireless network interface 130 functions to facilitate air interface communication with mobile devices served by RAN 102. Such air interface communication may be carried out according to one or more protocols such as those noted above. RAN 102 may send various messages to served mobile devices via wireless network interface 130. For instance, RAN 102 may send to mobile device 104 via network interface 130, the above-discussed neighbor list update messages and handoff direction messages. Further, RAN 102 may receive various messages from served mobile devices via network interface 130, such as the above-discussed signal strength report messages and handoff confirmation messages.

Processor 132 comprises one or more general purpose processors, such as INTEL processors or the like, and/or one or more special purpose processors, such as digital signal processors or application specific integrated circuits. To the extent processor 132 includes more than one processor, the processors may work separately or in combination. Data storage 134, in turn, comprises one or more volatile or non-volatile storage components, such as optical, magnetic, or organic storage, and data storage 134 can be integrated in whole or in part with processor 132.

As shown, data storage 134 comprises program logic 138 and neighbor list data 140. Program logic 138 may comprise machine language instructions or other logic executable or interpretable by processor 132 to carry out various RAN functions described herein. Although depicted separate from wireless network interface 130, program logic 138 may be provided as firmware or other logic integrated directly within wireless network interface 130.

Neighbor list data 140 may include data representing multiple different neighbor lists each listing sectors (coverage areas) providing wireless communication with the RAN 102 via different communication channels. For instance, in an example where the mobile device 104 is actively engaged with sector A, neighbor list data 140 may include, among other data, data representing a first neighbor list of sectors neighboring sector A that provide communication on a first communication channel (e.g., an 800 MHz band channel). Accordingly, the first neighbor list included in the neighbor list data 140 can be a list of sectors operating on the first communication channel that the mobile device 104 may move to from sector A.

Further, neighbor list data 140 may include, among other data, data representing a second neighbor list of sectors neighboring sector A that provide communication on a second communication channel (e.g., a 1900 MHz band channel). Accordingly, the second neighbor list included in the neighbor list data 140 can be a list of sectors operating on the second communication channel that the mobile device 104 may move to from sector A. Thus, in one example, the first list can include sectors B, D, and D, which can be sectors neighboring sector A and operating at an 800 MHz frequency band and the second list can include sectors E, F, and G, which can be sectors neighboring sector A and operating at a 1900 MHz frequency band.

In some examples, the neighbor list data 140 may also include data representing a third neighbor list (or any number of additional neighbor lists) of sectors neighboring sector A that provide communication on a third communication channel. Any number of additional neighbor lists each listing sectors operating on additional communication channels may also be included.

The geographic regions (coverage areas) of each of the sectors B-G may at least partially overlap the coverage area of sector A. Further, the geographic regions of the sectors in the first neighbor list (e.g., sectors B-D) may at least partially overlap the coverage areas of the geographic regions of the sectors in the second neighbor list (e.g., sectors E-G). For example, a radiation pattern of a directional antenna structure of the BTS(s) 106 can define a geographic region of sector C (on the first communication channel), and the same and/or different antenna structure can define a geographic region of sector F (on the second communication channel) that partially or wholly overlaps the region of sector C. In some examples, the geographic regions of the two sectors may be approximately equal.

In another example, the mobile device 104 may be actively connected to multiple sectors simultaneously, such as in a CDMA system where the active set includes both sector A and sector B. In such an example, the neighbor list data 140 can include multiple neighbor lists for each of the sectors in the active set to list neighbors according to their respective communication channels. For example, the neighbor list data 140 can include distinct neighbor lists for sector A: one for neighboring sectors operating at the first communication channel, another for neighboring sectors operating at the second communication channel. Similarly, the neighbor list data 140 can include distinct neighbor lists for sector B: one for neighboring sectors operating at the first communication channel, another for neighboring sectors operating at the second communication channel.

Moreover, the neighbor list data 140 can include such channel-specific neighbor lists for a combination of neighbors of sector A and B (and/or additional sectors in the mobile devices' active set) that are populated and/or ordered according to signal strengths of signals from sectors in the active set. For example, where the active set includes both sectors A and B, and A is determined to have a greater signal strength than B (e.g., according to signal strength measurements made by the mobile device 104), the neighbor list can be ordered with neighbors of sector A listed before neighbors of sector B, and/or with a relatively greater number of neighbors of sector A than of sector B. When, for example, neighboring sectors are scanned to estimate signal strengths in an order indicated by the neighbor list, placing neighbors determined to be relatively more likely to trigger a handoff message higher on the list allows for handoff exchanges to occur sooner.

Thus, some embodiments of the present disclosure can include associating an order and/or population of the channel-specific neighbor lists with predetermined memberships and/or relative signal strengths of sectors in the active set of the mobile device 104. Membership and/or relative signal strengths of sectors in the active set of the mobile device 104 can generally be associated with a geographic location (e.g., a position where a measured signal strength combination is estimated to occur). The RAN 102 can accordingly be configured to provide pre-determined neighbor lists that are optimized for particular estimated locations of the mobile device 104. In this way, different neighbor lists may be provided to mobile devices in different locations, based on a pre-determined association between active set membership and/or relative signal strengths and neighbor list population and/or ordering.

Figure 3:
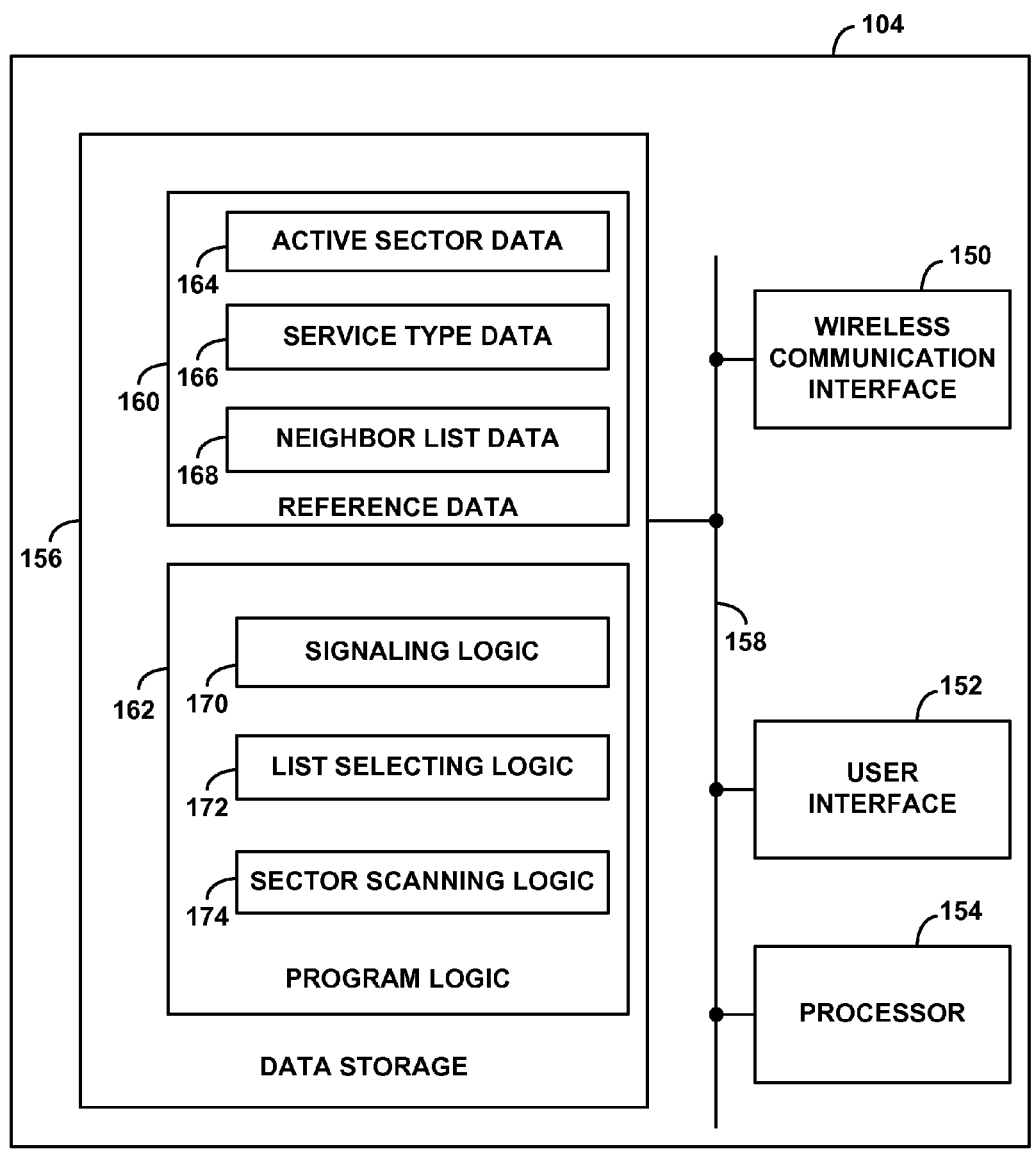
FIG. 3 is a simplified block diagram of an example mobile device.

FIG. 3 is a simplified block diagram showing some of the functional components that can be included in a mobile device, such as mobile device 104, in accordance with an example embodiment. As shown, mobile device 104 includes a wireless communication interface 150, a user interface 152, a processor 154, and data storage 156, all of which may be communicatively linked together by a system bus, network, or other connection mechanism 158.

Wireless communication interface 150 functions to facilitate air interface communication with RAN 102. For example, mobile device 104 may receive various messages from RAN 102 via wireless communication interface 150, such as the above-discussed handoff direction messages and neighbor list update messages. Further, mobile device 104 may send various messages to RAN 102 via wireless communication interface 150, such as the above-discussed signal strength report messages and handoff confirmation messages. Such communication may be carried out according to one or more protocols such as those noted above. For instance, in some embodiments, wireless communication interface 150 may support CDMA communication and/or LTE communication. As such, wireless communication interface 150 may be a transceiver including an antenna structure and a receiver, which enables mobile device 104 to tune to signals from coverage areas, so as to facilitate scanning pilot signals and/or reference signals from various sectors (e.g., to measure signal strengths), and so forth. An example wireless communication interface is a mobile station modem (MSM) series chipset manufactured by Qualcomm Incorporated, together with one or more internal or external antennas.

User interface 152 includes components for receiving input from a user of mobile device 104 and providing output to a user of mobile device 104. For instance, user interface 152 may include a keypad, touch-sensitive display, microphone, and camera for receiving user input, and a display panel, speaker, and haptic feedback system for providing user output. Further, user interface 152 may include analog/digital conversion circuitry to facilitate conversion between analog user input/output and digital signals processed by the mobile device 104.

Processor 154 comprises one or more general purpose processors, such as INTEL processors or the like, and/or one or more special purpose processors, such as digital signal processors or application specific integrated circuits. To the extent processor 154 includes more than one processor, the processors may work separately or in combination. Data storage 156, in turn, comprises one or more volatile or non-volatile storage components, such as optical, magnetic, or organic storage, and data storage 156 can be integrated in whole or in part with processor 154. Further, the processor 154 may be a component of wireless communication interface 150, such as a chip set. Thus, in some embodiments, the functions of the processor 154 described herein may be performed by any combination of one or more general purpose or special purpose processors, any one of which may be included in the wireless communication interface.

As shown, data storage 156 includes reference data 160 and program logic 162. Reference data 160 may include, among other data, active sector data 164, service type data 166, and neighbor list data 168. Active sector data 164 includes indications of sector(s) with which the mobile device 104 is presently set to communicate, such as one or more sectors in an active set identified by, for example, PN offsets. As noted above, mobile device 104 may receive a new set of active set members each time the mobile device receives a handoff direction message from RAN 102. Accordingly, the active sector data 164 may be updated each time the mobile device 104 receives a new handoff direction message.

Service type data 166 includes indications of a type of communication transmitted in a call in which the mobile device 104 is actively engaged. For example, the service type data 166 can include an indication of whether a present, actively engaged call is a voice call or a data session. In some examples, a voice call can be indicated in the service type data 166 by a service option code (or other identifier) for a circuit-switched communication protocol, such as employed in traditional voice communications (e.g., service option 3 (SO3) specified by Qualcomm Inc.). Similarly, a data session can be indicated in the service type data 166 by a service option code (or other identifier) for a packet-switched communication protocol (e.g., service option 33 (SO33) specified by Qualcomm Inc.). In some examples, the service type data 166 can optionally include an indication to distinguish voice over internet protocol (VOIP) transmissions from other types of packet-switched data communications. The service type data 166 can be reset upon initiation of each actively engaged call. For example, during initiation of a voice call (and optionally during initiation of a call for communicating a VOIP transmission), the service type data 166 can be set to identify the present actively engaged call as a voice call, and during initiation of a data session, the service type data 166 can be set to identify the present actively engaged call as a data session.

Neighbor list data 168 includes data representing a plurality of neighboring coverage areas. The neighbor list data 168 can indicate a communication channel (e.g., frequency band) for each neighboring coverage area. The neighbor list data 168 can be based on a single neighbor list update message received by the mobile device 104. For example, a neighbor list update message can include multiple neighbor lists and specify which service types (or which frequency bands) correspond to each neighbor list. A single neighbor list update message may alternatively include a single list that combines neighboring coverage areas operating at different frequency bands, but such a combined list also includes an indication of which service types (or which frequency bands) correspond to each entry in the combined neighbor list so that sub-lists for each service type can be constructed by the mobile device. The neighbor list data 168 can also be based on more than one neighbor list update message received by the mobile device 104. For example, the RAN 102 may send multiple neighbor list update messages over time, with different messages including neighboring sectors for different communication channels. For example, the RAN 102 may send neighbor list update messages that alternate between a list of neighboring coverage areas for a first communication channel and a list of neighboring coverage areas for a second communication channel. In such an example, the mobile device 104 can receive both such neighbor list update messages to construct the neighbor list data 168.

Program logic 162, in turn, may comprise machine language instructions or other logic executable or interpretable by processor 154 to carry out various functions described herein. As shown, for instance, program logic 162 includes signaling logic 170, signal strength measurement logic 172, list selecting logic 174, and sector scanning logic 176. Although depicted separate from wireless communication interface 150, program logic 162 may be provided as firmware or other logic integrated directly within wireless communication interface 150 (e.g., such as a processing system implemented with a wireless chipset). Other arrangements are possible as well.

Signaling logic 170 functions to engage in control signaling with RAN 102, such as with BSC 108 via wireless communication interface 150. This signaling may include the above-discussed signal strength report messages, handoff direction messages, neighbor list update messages, and handoff confirmation messages, among a variety of other signaling for initiating and/or managing communication on the cellular wireless system. The signaling logic 170 can also function to operate the wireless communication interface 150 to send transmissions to the RAN 102 and receive transmissions from the RAN 102 to cause the mobile device 104 to engage in a call (e.g., an ongoing exchange of data or voice transmissions between the RAN 102 and the mobile device 104).

While the mobile device 104 is engaged in a call (e.g., a voice call or data session), the list selecting logic 172 functions to select a list of neighbor coverage areas for scanning. The list selecting logic 172 selects a neighbor list from the neighbor list data 168 according to a service type of the engaged call as indicated by the service type data 166. For example, the list selecting logic 172 can select a neighbor list of coverage areas that communicate on a communication channel associated with the service type of the engaged call (e.g., as indicated by the service type data 166). In one example voice service can be associated with an 800 MHz band communication channel while data service can be associated with a 1900 MHz band communication channel. Thus, the list selecting logic 172 can function to select a list of neighbor coverage areas operating at the 800 MHz channel if a call on which the mobile device 104 is actively engaged is a voice call. Similarly, the list selecting logic 172 can function to select a list of neighbor coverage areas operating at the 1900 MHz channel if the call is a data session. Such a channel-specific neighbor list selected by the list selecting logic 172 can be one of a number of neighbor lists included in the neighbor list data 168 (or a subset of neighbors included in the neighbor list data 168).

Sector scanning logic 174 functions to cause mobile device 104 to scan and measure (e.g., regularly monitor) the signal strength of coverage areas in the selected neighbor list. The sector scanning logic 174 can cause the mobile device to tune the wireless communication interface 150 to receive pilot signals or reference signals from the coverage areas included in the selected neighbor list. The sector scanning logic 174 can also optionally estimate the signal strength (e.g., Ea/Io) of detected pilot signals or reference signals. Sector scanning logic 174 can optionally cause mobile device 104 to scan the various coverage areas in an order indicated by the selected neighbor list (e.g., an order optimized for particular relative signal strength of the active set members).

In some embodiments, the list selecting logic 172 can select from neighbor coverage areas included in the most recent update of the neighbor list data 168. In this way, only neighbor coverage areas that the RAN 102 includes in the most recent neighbor list update message are scanned. As a result, the neighbor list data 168 may or may not include neighbor coverage areas associated with a preferred communication channel (e.g., a communication channel associated with the service type of an active call according to the list selecting logic 172). In the event that the neighbor list data 168 does not include any neighbor sectors operating on the preferred channel (or when it includes less than a threshold numbers such as only one or only two, etc.), the list selecting logic 172 may operate to select a list of neighbor coverage areas that operate on a different communication channel. For example, while the mobile device 104 is actively engaged in a voice call, the list selecting logic 172 may first attempt to identify a list of neighbor coverage areas operating at the 800 MHz band, but if no such neighbor coverage areas are included in the neighbor list data 168 (or an insufficient number of such neighbor coverage areas are included), the list selecting logic 172 may instead select a list of neighbor coverage areas operating at the 1900 MHz band.

Thus, for instance, when the mobile device 104 is engaged in a call, the processor 154 can execute the list selecting logic 172 to select a channel-specific neighbor list (e.g., a list of neighbor coverage areas operating on a communication channel associated with the service type of the active call). The processor 154 can then execute the sector scanning logic 174 to measure signal strengths of pilot signals or reference signals from the coverage areas in the selected channel-specific neighbor list. When mobile device 104 scans a neighbor coverage area having a sufficiently strong pilot signal or reference signal (e.g., a signal strength that exceeds a threshold value), processor 154 may execute list signaling logic 172 to cause mobile device 104 to send a signal strength report message to BSC 108 (or another component in RAN 102). The RAN 102 may then determine to send a handoff direction message to the mobile device 104 to cause the mobile device 104 to hand off the active call to the neighbor coverage area with the strong pilot signal or reference signal.

The functions of the mobile device described in connection with in FIG. 3 can generally be implemented by a combination of hardware, software, and/or firmware modules. For example, while a variety of processing steps and determinations performed by the mobile device 104 are described in connection with processor 154 executing program logic 162 to achieve the functions described above, it is noted that at least some of the functions described herein may be performed by the processing capabilities within the wireless chipset of the wireless communication interface 150. That is, in one explanatory, non-limiting example of such an implementation, the wireless chipset included in the wireless communication interface 150 may function to select a list of neighbor coverage areas based on a service type of an ongoing call, similarly to the function of the list selecting logic 172. In other words, the functions of the list selecting logic 172 (and/or any of the other functions of the program logic 162) may be achieved in whole or in part by the chipset of the wireless communication interface 150.

In some implementations, some of the functions of the mobile device 104 described herein may be performed by a combination of the processor 154 executing program logic 162 and the wireless chipset in the wireless communication interface 150 working together or separately. Thus, according to some embodiments of the present disclosure, the various logic functions of the mobile device described herein are described as performed by a controller, which is understood to be any combination of the processor 154 executing program logic 162 and the chip set of the wireless communication interface 150 operating to achieve the functions described herein. Accordingly, some embodiments of the present disclosure refer to the mobile device as including a controller and an antenna for wireless communication, and the controller is understood to include any combination of the chipset and processor functioning to communicate with the antenna as described herein.

2. Example Operation

Figure 4:
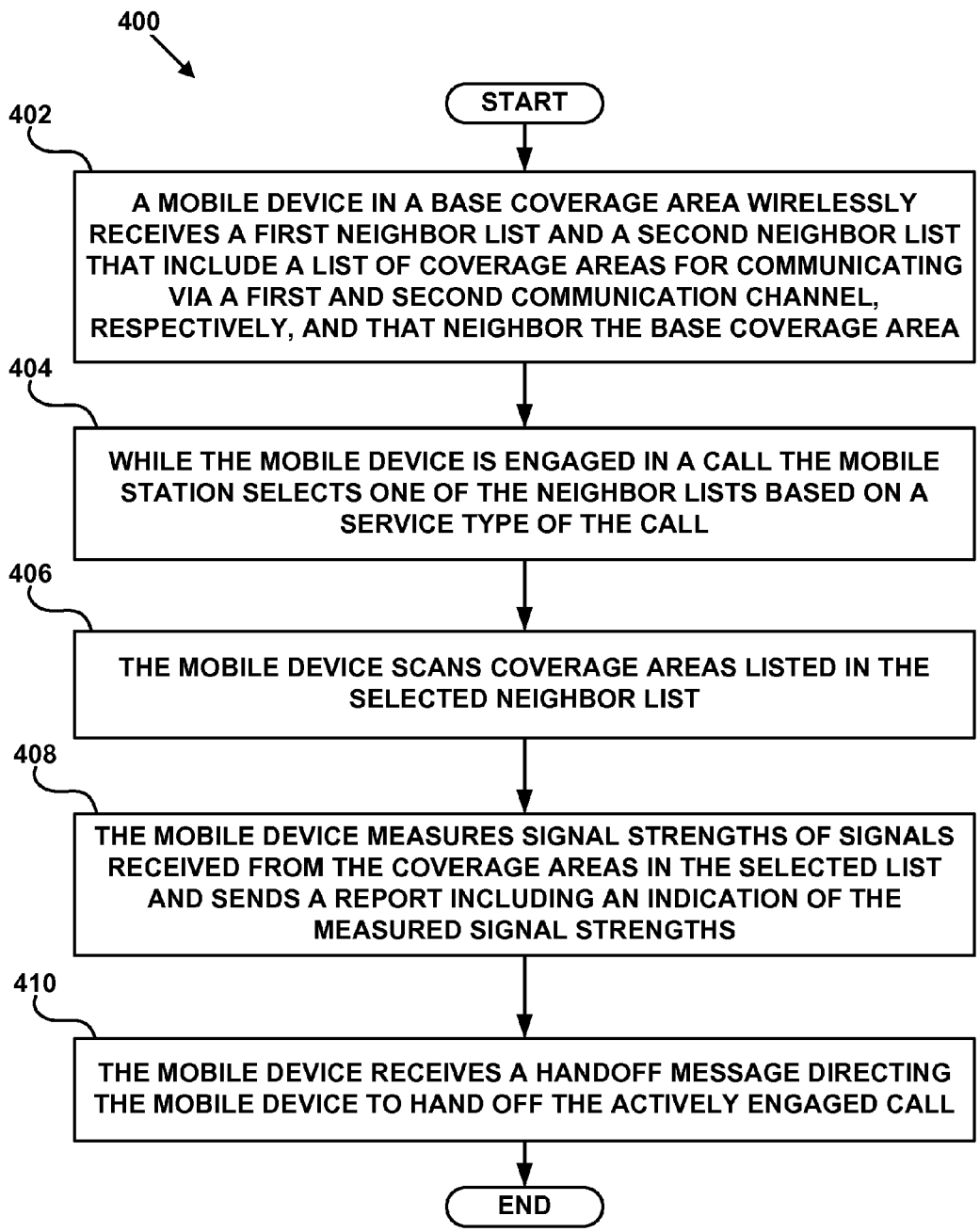
FIG. 4 is a flowchart of an example process that can be carried out by an example mobile device to select a neighbor list for scanning.

FIG. 4 is a flowchart of a process 400 that can be carried out by an example mobile device, such as mobile device 104. As shown at block 402, the mobile device communicates in a base coverage area of a radio access network, such as RAN 102, and the mobile device wirelessly receives a first neighbor list and a second neighbor list transmitted by the RAN. The first and second neighbor lists can include a list of coverage areas neighboring the base coverage area (e.g. neighboring coverage areas), with the first neighbor list including coverage areas communicating via a first communication channel and the second neighbor list including coverage areas communicating via a second communication channel.

The RAN can transmit the first and second neighbor list in two (or more) distinct neighbor list update messages communicated sequentially in alternating fashion. The RAN can alternatively transmit the first and second (and/or more) neighbor lists in a single message that contains multiple, channel-specific lists. The RAN can also transmit the first and second (and/or more) neighbor lists as parts of a single list that combines neighboring coverage areas operating at more than one communication channel. Such a combined list may also include data, such as tags, to indicate the communication channel of each coverage areas, such as a listing of coverage areas with entries specifying the frequency band each coverage area operates at. The mobile device can then assemble the first and second neighbor lists from such a combined list of neighboring coverage areas. For example, the mobile device can cull the combined list to select the coverage areas using the first communication channel to form the first neighbor list and select the coverage areas using the second communication channel to form the second neighbor list.

At block 404, the mobile device selects one of the first or second neighbor lists based on a service type of a call the mobile device is actively engaged in. For example, the mobile device may select a neighbor list operating at a communication channel associated with the service type of the active call, as discussed in connection with the list selecting logic 172 discussed above in connection with FIG. 3. Thus, in one example, the mobile device 104 may select a list of 800 MHz band neighbors while engaged in a voice call and select a list of 1900 MHz band neighbors while engaged in a data session.

At block 406, the mobile device scans the neighboring coverage areas in the selected neighbor list. For example, the mobile device 104 may execute the sector scanning logic 174 to scan for pilot signals or reference signals from the neighboring coverage areas in the selected list. In some examples, the mobile device may tune its wireless communication interface according to parameters in the selected list identifying each of the scanned coverage areas (e.g., PN offsets, carrier frequency offsets, etc.) in order to distinguish pilot signals or reference signals from the respective neighbor coverage areas.

At block 408, the mobile device measures signal strengths of the signals received from the coverage areas in the selected list and sending a report including an indication of the measured signal strengths. In some embodiments, the signal strength report may only be sent when the measurements of the signal strengths indicate a trigger condition (e.g., a signal strength that exceeds a threshold value).

At block 410, the mobile device receives a handoff direction message from the RAN 102, directing the mobile device to hand off the actively engaged call. The handoff direction message can be a message generated by a component in the RAN (a BSC, an eNB, a mobility management entity, etc.) based at least in part on evaluation of the signal strength report message from the mobile device. However, the handoff determination may also be based on other factors, such as present network loading conditions and available capacity, for example.

In some embodiments of the present disclosure, a mobile device undergoing the process 400 operates to preferentially hand off an active call to neighboring coverage areas operating at predetermined communication channels based on a service type of the active call. In this way, calls of a first service type can be preferentially directed to be carried over a first communication channel, and calls of a second service type can be preferentially directed to be carried over a second communication channel. For example, voice service calls can be preferentially handed off to 800 MHz band coverage areas, when available, and data service calls can be preferentially handed off to 1900 MHz band coverage areas, when available.

Carrying voice traffic at the 800 MHz band may be preferential, because the 800 MHz band provides relatively greater building penetration, range, etc., than higher frequency channels. As a result, the voice traffic can be provided with more continuous connections, and thus less "dropped calls," whereas packet-switched data connections are urged to the 1900 MHz band. Moreover, even when all network traffic is packet-switched data, such as in an LTE system, separating network traffic between voice traffic and data traffic can allow for differences in the quality of service between the two different communication channels, because the two types of traffic demand different quality of service. For example, voice traffic is relatively sensitive to delay, but is relatively insensitive to dropped packets. On the other hand, data traffic is relatively insensitive to delay, but is relatively sensitive to dropped packets. Thus, voice traffic may be communicated in relatively small packets transmitted at a relatively high rate, whereas data traffic may be communicated in relatively large packets transmitted at a low rate. Dividing network traffic on different channels according to service type allows for efficiently structuring different channels with different quality of service parameters.

Figure 5:
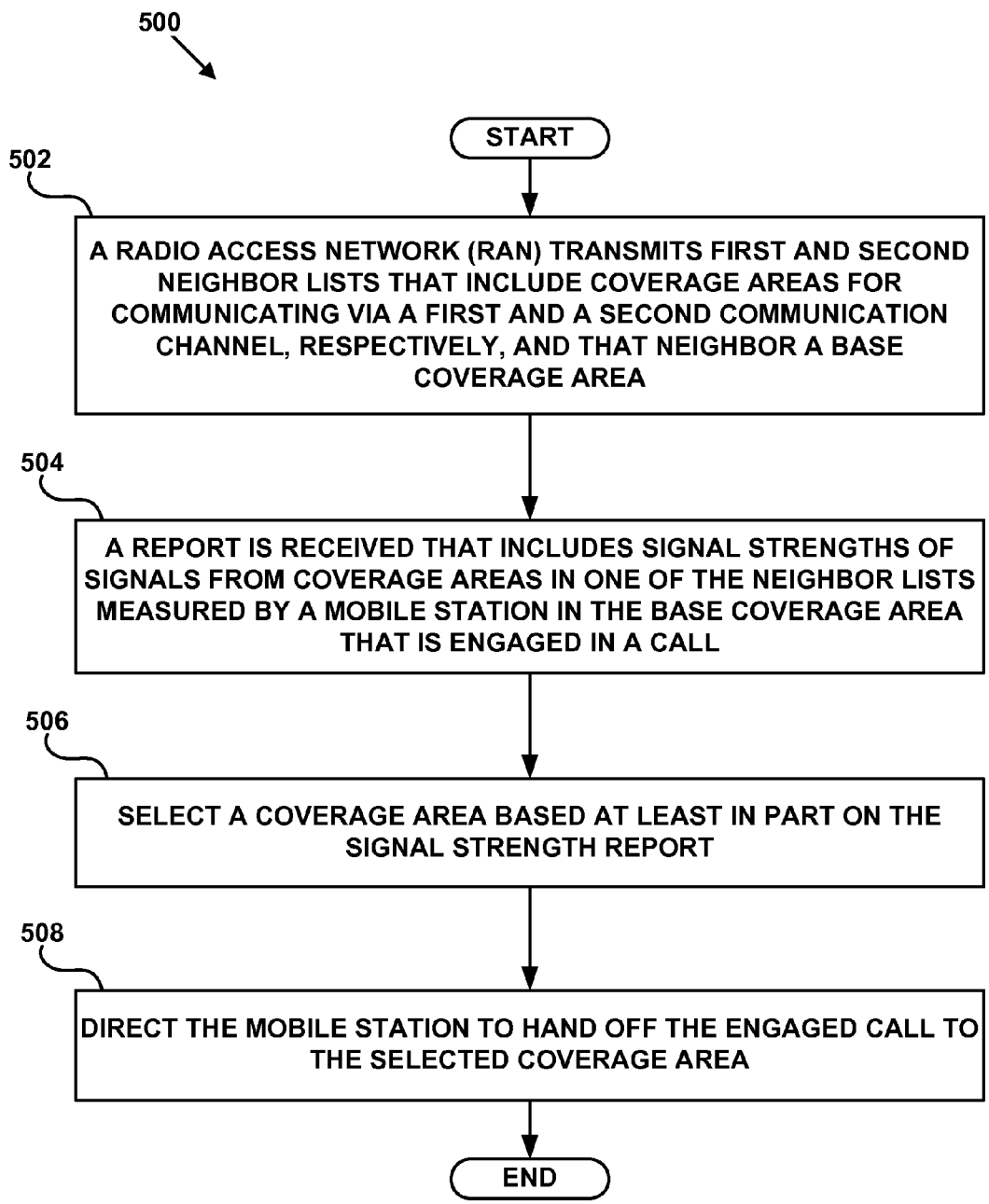
FIG. 5 is a flowchart of an example process that can be carried out by an example radio access network to manage network traffic by transmitting neighbor lists.

FIG. 5 is a flowchart of an example process 500 that can be carried out by an example radio access network, such as RAN 102. The process 500 can be carried out in a RAN serving a mobile device that is actively engaged in a call and situated in a base coverage area. By way of example, the process 500 may be carried out by a combination of network management components in RAN 102, such as the BSCs 108 and/or radio network controllers, such as described in connection with the example CDMA system architecture referenced in connection with FIG. 1 above. Additionally or alternatively, the process 500 may be carried out by a combination of eNBs and/or mobility management entities, such as described in connection with the example LTE system architecture referenced in connection with FIG. 1 above.

As shown at block 502, the RAN 102 transmits first and second neighbor lists that include coverage areas for communicating via a first and a second communication channel, respectively, and that neighbor the base coverage area. The RAN 102 may transmit the first and second neighbor lists in separate, alternating messages or can transmit the first and second neighbor lists in a single message. Moreover, the RAN 102 can transmit a single message that includes multiple coverage areas operating at different frequency bands in a single list. Such a message with a single list combining coverage areas in multiple frequency bands can include data that associates each coverage area with a communication channel.

At block 504, the RAN receives a report that includes indications of signal strengths measured by the mobile device in the base coverage area (e.g., a signal strength report message from the mobile device). The mobile device can be configured to select only one of the neighbor lists for scanning and/or measuring signal strengths from and reporting results, such as according to the functions of the list selecting logic 172 described above. As a result, the report received at block 504 may include indications of signal strengths from neighbor coverage areas listed in only one of the neighbor lists transmitted to the mobile device.

At block 506, the RAN selects a coverage area for handoff based at least in part on the received signal strength report message. For example, where the signal strength report indicates that signal strength from a neighbor coverage area exceeds a threshold value, the RAN 102 may select that neighbor coverage area for handoff. However, the handoff determination by the RAN 102 may also be influenced by available network capacity, etc.

At block 508, the RAN 102 generates a handoff direction message to instruct the mobile device 104 to hand off its presently engaged call to the neighbor coverage area selected in block 506. In some embodiments, the RAN 102 may then receive a handoff confirmation message back from the mobile device 104 to confirm that the communication of the engaged call was handed off to the selected coverage area. The process 500 may further involve the RAN 102 responsively sending an updated neighbor list to the mobile device 104 upon receiving the handoff confirmation message. Such an updated neighbor list can include, for example, coverage areas neighboring the new active coverage area (i.e., the coverage area selected in block 506).

As a result of the handoff, the mobile device 104 may pass between the first and second coverage areas while maintaining a substantially continuous connection with the RAN such that the engaged call can be continued without interruption.

Further, it is noted that the present disclosure extends to scenarios in which more than two frequency bands are selected from and more than two channel-specific neighbor lists are provided to mobile devices. In such an example, a mobile device selects at least one of the provided neighbor lists to scan for handoff while the mobile device is engaged in an active call. The mobile device can select a neighbor list for scanning based on the service type of the call, and the list selecting logic 172 can be appropriately configured to account for selection between more than two neighbor lists based on the service type of an actively engaged call.

Figure 6:
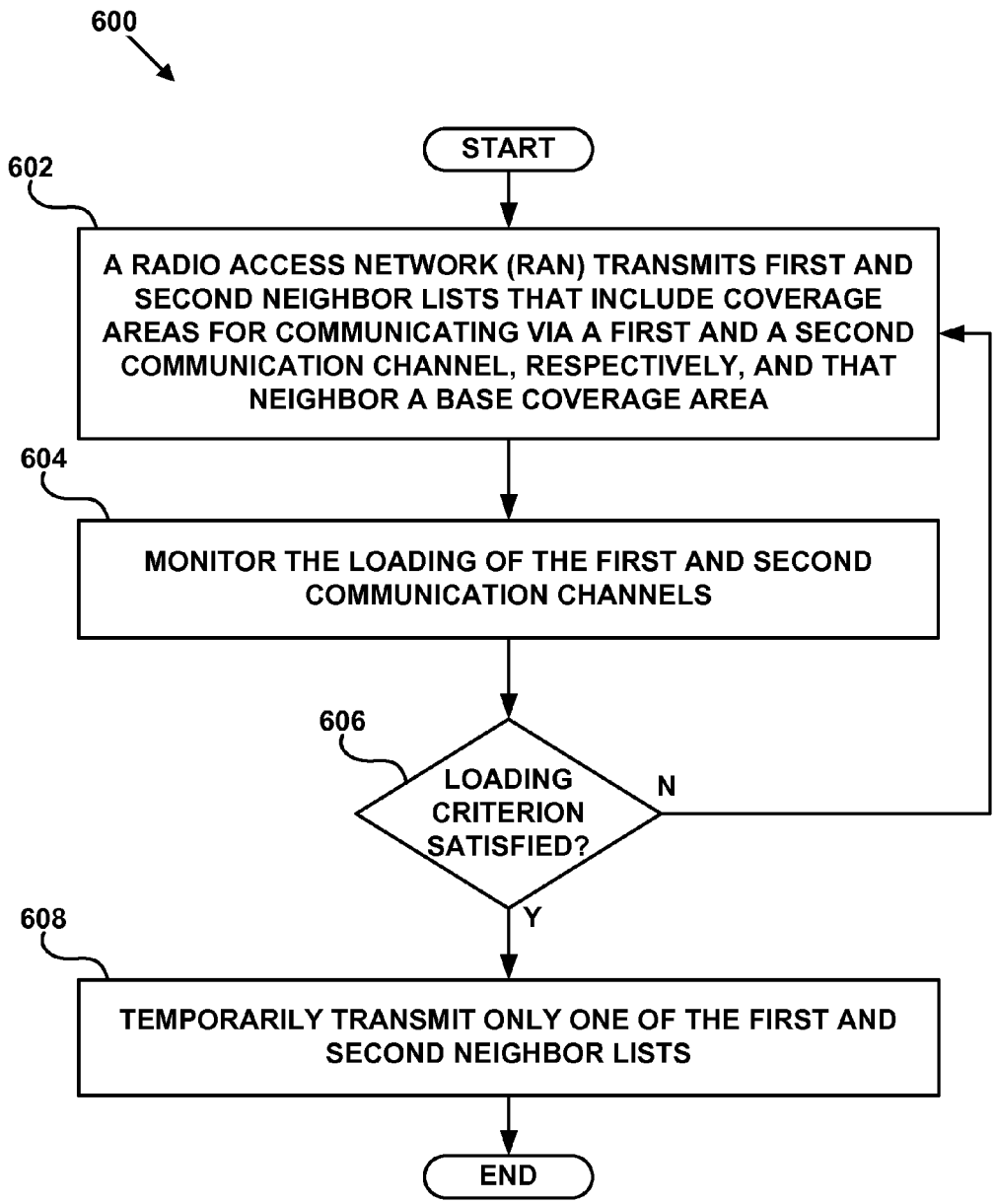
FIG. 6 is a flowchart of an example process that can be carried out by an example radio access network to manage network traffic by selectively transmitting neighbor lists.

In an example implementation, the RAN may further condition transmission of neighbor lists as described above on network loading conditions, available capacity, and other such factors. For example, when a channel is loaded beyond a threshold level, the RAN may temporarily cease transmitting the neighbor list for that channel to prevent additional network traffic from handing off to that channel. FIG. 6 is a flowchart of an example process 600 that can be carried out by an example radio access network to manage network traffic on different channels by selectively transmitting neighbor lists. Similar to the process 500 discussed above, the process 600 can be carried out in a RAN serving a mobile device that is actively engaged in a call and situated in a base coverage area.

As shown in FIG. 6, at block 602, a RAN transmits first and second neighbor lists that include coverage areas for communicating via a first and a second communication channel, respectively, and that neighbor the base coverage area. While the RAN transmits both the first and second neighbor lists, the mobile device(s) that receive the lists continue to select from either list to scan for handoff while engaged in a call. Thus, while the RAN transmits both the first and second neighbor lists, as in block 602, the network traffic continues to be distributed across the first and second channels based on the service types of the communication carried on the RAN, as in the process 500 shown in FIG. 5.

At block 604, the RAN monitors the loading of the first and second communication channels. For example, the RAN can monitor available capacity on the first and second communication channels and compare the measured capacity to absolute and/or relative threshold levels. The loading information monitored in block 604 is used in decision block 606 to determine whether to alter the transmission of neighbor lists to adjust network loading.

At decision block 606, the RAN determines whether one of the first or second channels is sufficiently loaded to satisfy a loading criterion. For example, the loading criterion may be satisfied when the bandwidth on the first or second channel exceeds a predetermined level (e.g., 80% of available capacity, 90% of available capacity, etc.) or when the balance of bandwidth carried between the two channels exceeds a predetermined ratio (e.g., the first channel carrying 3 times the bandwidth of the second channel, 4 times the bandwidth of the second channel, etc.). Moreover, such loading criterion may not be fixed, and may be adjusted dynamically, such as due to the present loading of the cellular wireless network and/or other factors.

If the loading criterion of block 606 is not satisfied, such as when the network loading monitored in block 604 is within an acceptable range, the process 600 returns to block 602, and the RAN continues to transmit both neighbor lists to allow mobile devices in the base coverage area to continue to select from neighbor lists on both channels to scan for handoff. If the loading criterion of block 606 is satisfied, such as when the network loading monitored in block 604 is not within an acceptable range, the process 600 goes to block 606, and the RAN modifies the transmission of the neighbor lists in order to cause a change in the distribution of network traffic.

At block 608, the RAN temporarily transmits only one of the first and second neighbor lists, rather than transmitting both lists as in block 602. As a result, mobile devices in the base coverage area (e.g., the mobile device 104) will only select from neighboring coverage areas in the transmitted neighbor list, and mobile devices will thereby be inhibited from handing off to the neighbors in the non-transmitted neighbor list. In some examples, the RAN determining that the first channel is overloaded, in the decision block 606, may result in the RAN temporarily ceasing transmission of the neighbor list for the first channel in block 608. Similarly, the RAN determining that the second channel is overloaded, in the decision block 606, may result in the RAN temporarily ceasing transmission of the neighbor list for the second channel in block 608. During the temporary omission of one of the neighbor lists, during block 608, mobile devices engaged in calls scan the coverage areas in the neighbor list that the RAN continues to transmit and as a result, the mobile devices are inhibited from scanning the neighbors in the omitted neighbor list.

In some examples, the RAN can continue to transmit only one of the neighbor lists (as in block 608) while the loading criterion remains satisfied. Thus, in some embodiments, while the RAN omits one of the neighbor lists in block 608, the RAN can continue to regularly monitor the network loading (as in block 604) and determine whether the loading criterion is satisfied (as in block 606). Upon determining the loading criterion is no longer satisfied, the process 600 may return to block 602 to transmit both neighbor lists.

Furthermore, it is noted that while the process 600 in FIG. 6 is described in connection with monitoring network loading on two channels and temporarily omitting transmission of one neighbor list, the process may be extended to scenarios with more than two channels. For example, the process 600 may involve monitoring network loading on more than two channels and temporarily suspending transmission of one or more of a plurality of channel-specific neighbor lists in order to urge network traffic to handoff to the channels associated with the transmitted neighbor lists.

Some embodiments of the present disclosure thereby allow a RAN to preferentially direct mobile devices to hand off actively engaged calls to neighboring coverage areas operating in communication channels that correspond to service types of the actively engaged calls. Thus, the RAN can operate to preferentially urge calls of a first service type to be carried on a first communication channel, whenever resources are available, and urge calls of a second service type to be carried on a second communication channel, whenever resources are available. This behavior may desirably allow for voice service calls, such as circuit-switched network connections and/or VOIP connections, to be preferentially communicated on an 800 MHz band (or another selected communication channel) while data service calls, such as packet-switched network connections, to be preferentially communicated on a 1900 MHz band (or another selected communication channel). As such, circuit-switched voice traffic (and optionally packet-switched VOIP connections) may be carried at the 800 MHz band.

3. Conclusion

Various example embodiments have been described above. Those skilled in the art will understand, however, that changes and modifications may be made to those examples, and that those examples may be combined, without departing from the scope of the claims.

What is claimed is:

1. A method comprising:
   wirelessly receiving, at a mobile device in a base coverage area, a first neighbor list and a second neighbor list, wherein the first neighbor list includes one or more coverage areas neighboring the base coverage area and configured to communicate via a first communication channel, and wherein the second neighbor list includes one or more coverage areas neighboring the base coverage area and configured to communicate via a second communication channel;
   while the mobile device is actively engaged in a call, the mobile device: (i) determining whether the actively engaged call communicates voice traffic or rather non-voice traffic, (ii) selecting one of the first or second neighbor lists based on the determination that the actively engaged call communicates voice traffic or rather non-voice traffic, and (iii) scanning the one or more coverage areas included in the selected neighbor list.

2. The method according to claim 1, wherein the first communication channel is associated with a circuit-switched voice communication protocol and the second communication channel is associated with a packet-switched data communication protocol, and wherein the determining includes identifying one of the voice or data communication protocols that corresponds to the type of traffic communicated by the actively engaged call.

3. The method according to claim 2, wherein the actively engaged call is a voice call a service type of the actively engaged call is a voice communication.

4. The method according to claim 2, wherein the actively engaged call is a data call and a service type of the actively engaged call is a non-voice data communication.

5. The method according to claim 1, further comprising:
   the mobile device measuring signal strengths associated with detected signals, from the one or more coverage areas included in the selected neighbor list; and
   the mobile device sending a signal strength report indicating the measured signal strengths.

6. The method according to claim 5, further comprising:
   receiving a handoff message directing the mobile device to hand off the actively engaged call to a selected coverage area included in the selected neighbor list; and
   responsive to receiving the handoff message, the mobile device wirelessly communicating in the selected coverage area to continue the actively engaged call.

7. The method according to claim 1, wherein the actively engaged call is initially carried out by wirelessly communicating via the first communication channel, the method further comprising: handing off the actively engaged call to a selected coverage area included in the second neighbor list such that the actively engaged call is continued via the second communication channel.

8. The method according to claim 1, wherein the first communication channel is an 800 megahertz band class and the second communication channel is a 1900 megahertz band class.

9. The method according to claim 1, wherein the one or more coverage areas in the first neighbor list are code division multiple access sectors operating on respective pseudo-random noise offsets, wherein the one or more coverage areas in the second neighbor list are code division multiple access sectors operating on-a respective pseudo-random noise offsets, and wherein the first and second neighbor lists identify the respective coverage areas at least in part by the respective pseudo-random noise offsets.

10. The method according to claim 1, wherein the first and second neighbor lists are received in a single neighbor list update message.

11. A method comprising: transmitting, to a base coverage area so as to be received by a mobile device situated therein, a first neighbor list and a second neighbor list, wherein the first neighbor list includes one or more coverage areas neighboring the base coverage area and configured to communicate via a first communication channel, wherein the second neighbor list includes one or more coverage areas neighboring the base coverage area and configured to communicate via a second communication channel, and wherein the mobile device is actively engaged in a call; receiving a signal strength report indicating signal strengths measured by the mobile device of detected signals from the one or more coverage areas included in a selected one of the first or second neighbor lists, wherein the selected neighbor list is selected by the mobile device based on the mobile device determining that the actively engaged call communicates voice traffic or rather non-voice traffic; selecting one of the one or more coverage areas included in the selected neighbor list based at least in part on the received signal strength report; and directing the mobile device to hand off the actively engaged call to the selected coverage area so as to continue the actively engaged call in the selected coverage area.

12. The method according to claim 11, wherein the transmitting the first neighbor list and the second neighbor list includes an indication of a voice or non-voice traffic type associated with the first communication channel and the second communication channel.

13. The method according to claim 11, wherein the first communication channel is associated with circuit-switched voice communication protocol and the second communication channel is associated with a packet-switched data communication protocol.

14. The method according to claim 13, wherein the actively engaged call is initially carried out by wirelessly communicating via the first communication channel, and wherein the second neighbor list is the selected neighbor list such that the actively engaged call is continued via the second communication channel following the handoff.

15. The method according to claim 11, wherein the transmitting includes transmitting the first and second neighbor lists together in a single neighbor list update message.

16. The method according to claim 11, further comprising:
following the transmitting the first and second neighbor lists, determining that the first channel is sufficiently loaded to satisfy a loading criterion; and while the first communication channel is sufficiently loaded to satisfy the loading criterion, transmitting the second neighbor list without transmitting the first neighbor list.

17. The method according to claim 11, further comprising:
determining a relative loading of the first and second communication channels in the base coverage area; and transmitting only one of the first and second neighbor lists based on the determined relative loading.

18. A mobile device comprising: an antenna for wirelessly communicating with a radio access network, including wirelessly receiving first and second neighbor lists each including one or more coverage areas associated with a respective communication channel; and a controller configured to: (i) use the antenna to send and receive signals to communicate information for an actively engaged call; (ii) determine whether the actively engaged call communicates voice traffic or rather non-voice traffic; (iii) select one of the first or second neighbor lists based on the determination that the actively engaged call communicates voice traffic or rather non-voice traffic; and (iv) scan the one or more coverage areas included in the selected neighbor list.

19. The mobile device according to claim 18, wherein the controller is further configured to: (i) measure signal strengths associated with detected signals from the one or more coverage areas included in the selected neighbor list; and (ii) send a signal strength report indicating the measured signal strengths.

20. The mobile device according to claim 18, wherein the first communication channel is associated with circuit-switched voice communication protocol and the second communication channel is associated with packet-switched data communication protocol, and wherein the controller determines whether the actively engaged call communicates voice traffic or rather non-voice traffic by identifying one of the voice or data communication protocols that corresponds to the type of traffic communicated by the actively engaged call.

* * * * *